Dec. 1, 1953
D. G. MERRILL
2,660,832
APPARATUS FOR ANNEALING GLASSWARE
Filed April 6, 1951
6 Sheets-Sheet 1
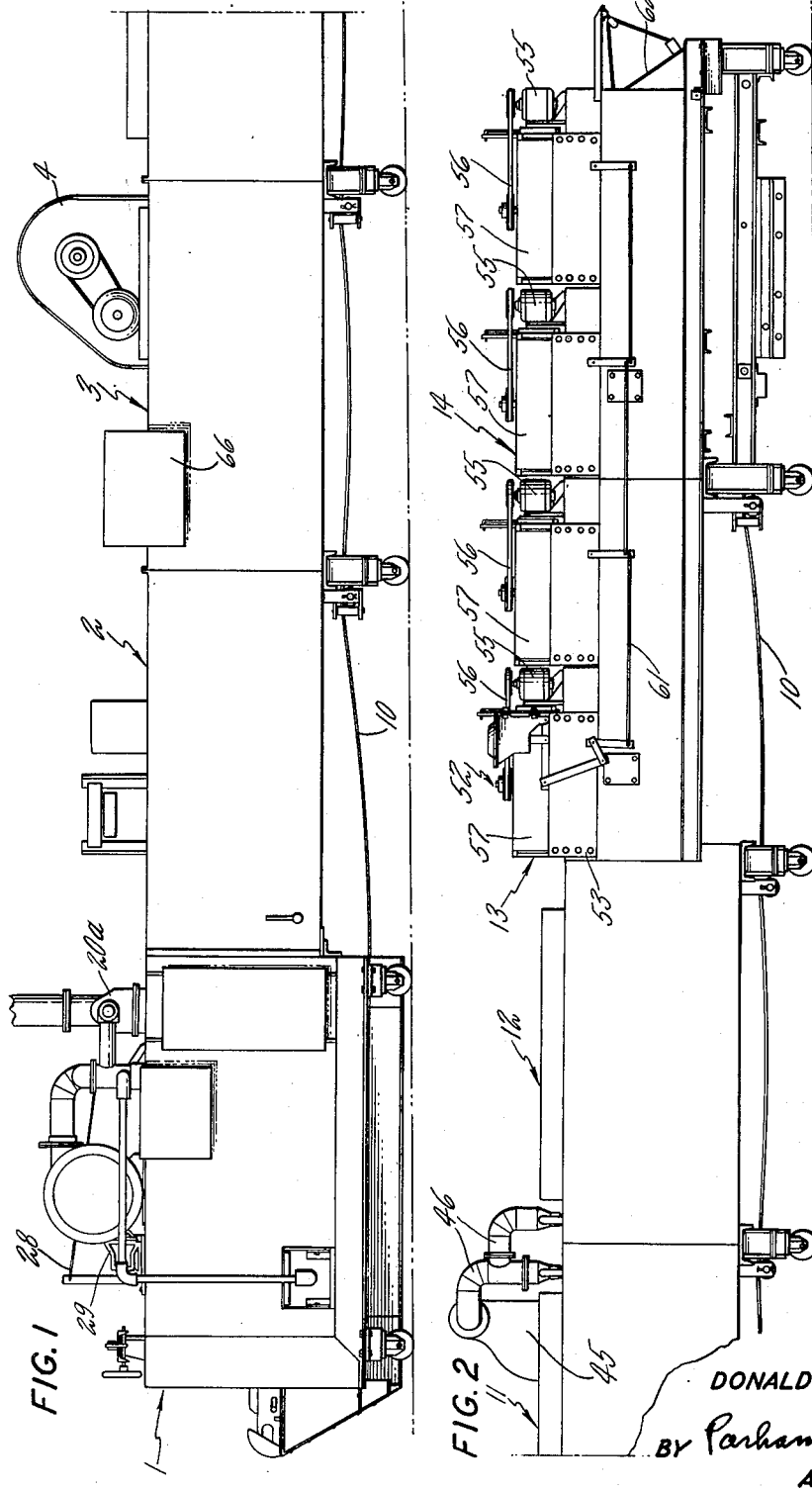
INVENTOR
DONALD G. MERRILL
BY Parham + Bates
ATTORNEYS Dec. 1, 1953  D. G. MERRILL  2,660,832
APPARATUS FOR ANNEALING GLASSWARE
Filed April 6, 1951  6 Sheets-Sheet 2

INVENTOR
DONALD G. MERRILL
BY Parham + Bates
ATTORNEYS

Dec. 1, 1953  D. G. MERRILL  2,660,832
APPARATUS FOR ANNEALING GLASSWARE
Filed April 6, 1951  6 Sheets-Sheet 3

INVENTOR
DONALD G. MERRILL
BY Parham & Bates
ATTORNEYS

Dec. 1, 1953  D. G. MERRILL  2,660,832
APPARATUS FOR ANNEALING GLASSWARE
Filed April 6, 1951  6 Sheets-Sheet 4

INVENTOR
DONALD G. MERRILL
BY Parham + Bates
ATTORNEYS

Dec. 1, 1953          D. G. MERRILL          2,660,832
APPARATUS FOR ANNEALING GLASSWARE
Filed April 6, 1951          6 Sheets-Sheet 5
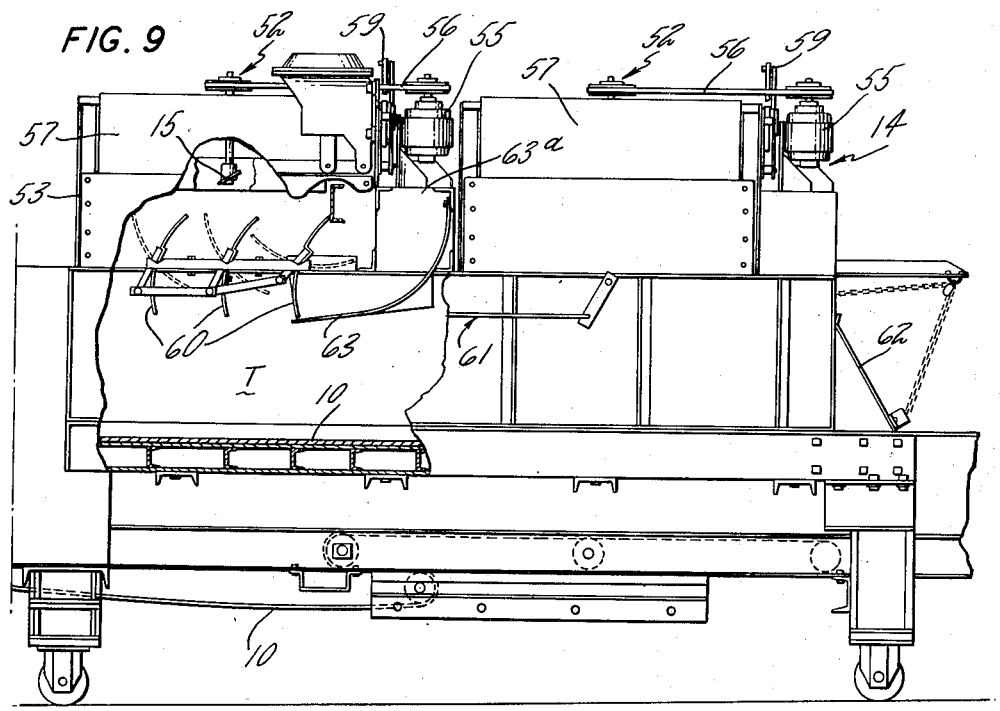
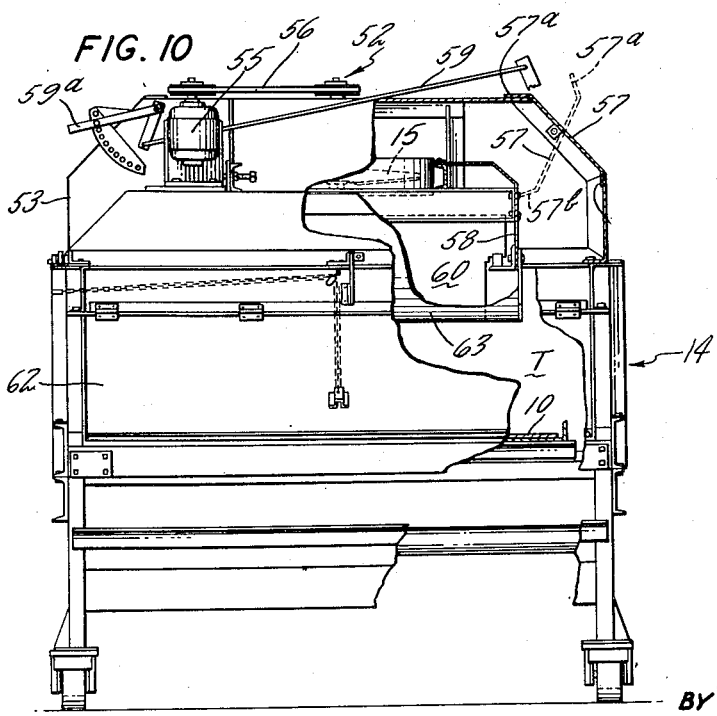
INVENTOR
DONALD G. MERRILL
BY Parham + Bates
ATTORNEYS Dec. 1, 1953  D. G. MERRILL  2,660,832
APPARATUS FOR ANNEALING GLASSWARE
Filed April 6, 1951  6 Sheets-Sheet 6

INVENTOR
DONALD G. MERRILL
BY Bates & Willard
ATTORNEYS

Patented Dec. 1, 1953

2,660,832

UNITED STATES PATENT OFFICE 2,660,832

APPARATUS FOR ANNEALING GLASSWARE

Donald G. Merrill, West Hartford, Conn., assignor to Emhart Manufacturing Company, Hartford, Conn., a corporation of Delaware Application April 6, 1951, Serial No. 219,685

6 Claims. (Cl. 49—47)

The present invention relates to improvements in apparatus for annealing glassware and more particularly to the operation and construction of an improved glassware annealing lehr in which heat is supplied at a single location and in which the temperature gradient through the entire annealing cycle is controlled by automatically regulating longitudinal drift of atmosphere through the lehr.

Heretofore automatic temperature controls have been applied to the initial or preheating stage of the cycle. However, factors such as the turning on and off of a multiplicity of small burners spaced longitudinally through the lehr have made it difficult to automatically control the cycle of open fired lehrs such as that disclosed in U. S. Patents Nos. 2,244,112 and 2,133,783 to D. G. Merrill, and of muffle-fired lehrs because the tunnel temperatures are not independent of firebox temperatures.

In a preferred embodiment of the present invention only a single firebox is utilized and longitudinal air movement or "drift" regulates the temperature gradient through the lehr.

Except for the front or firebox section, muffle fired, open fired and electric lehrs may be identical and conversion may be effected from one type to another by interchanging firebox sections. Conversion from one fuel to another is thereby simplified.

Other advantages obtained with lehrs embodying the invention include:

Completely automatic control through the entire critical annealing range and consistently good annealing with minimum attendance and attention of operating personnel.

High fuel economy and simplified construction and maintenance.

A high proportion of operating and working space to overall space requirements.

Close temperature control at all points in the lehr. Normally a ±10° F. tolerance can be obtained at both the front and rear ends of the lehr and even under abnormally abrupt changes, temperatures do not depart more than ±20° F. from those preselected.

Other advantages will be pointed out in, or become apparent from the following description and operation of illustrative lehr construction shown in the accompanying drawings, in which:

Figs. 1 and 2 together illustrate a side elevation of a lehr embodying the invention;

Fig. 9 is an enlarged side elevation view of the rear or forced cooling end of the lehr shown in Fig. 2 with a portion of the lehr wall broken away to show the interior thereof;

Figure 3:
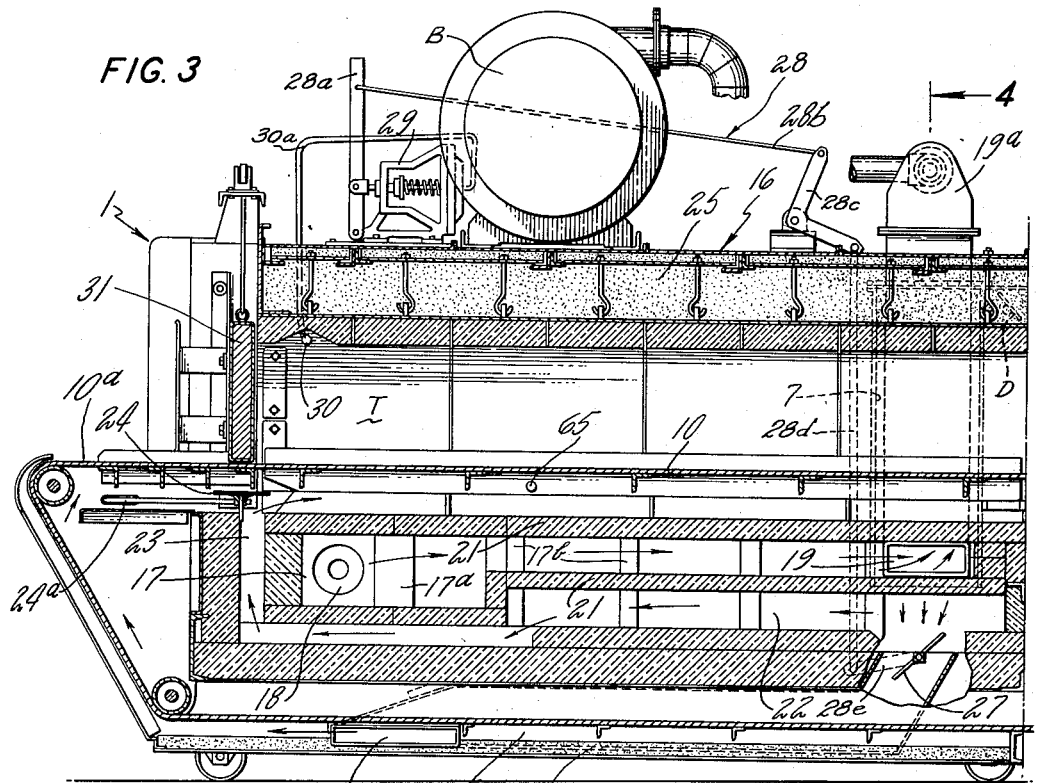
Fig. 3 is an enlarged longitudinal central vertical section of the muffled-type firebox or heating section at the front end of the lehr shown in Fig. 1.
Figure 4:
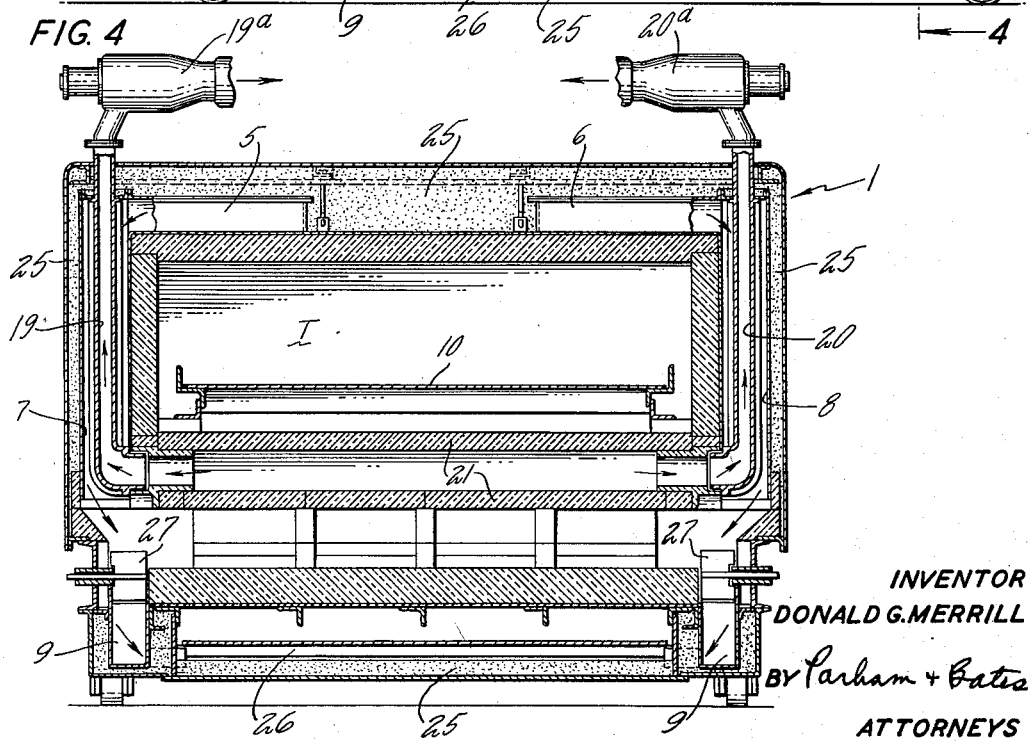
Fig. 4 is a cross-sectional view taken on line 4—4 of Fig. 3 showing a transverse section of the firebox.
Figure 11:
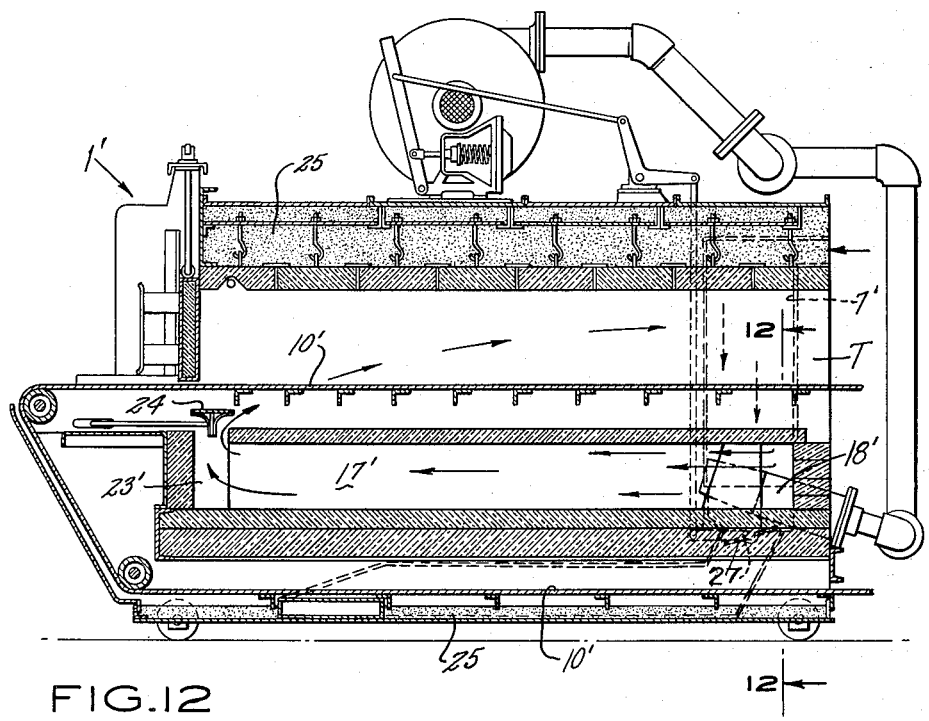
Figure 12:
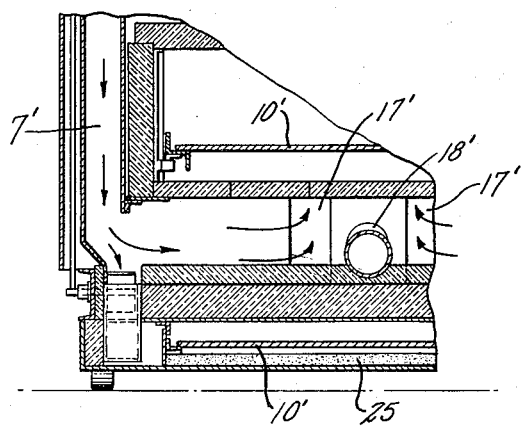

Fig. 10 is an end elevation of the rear or discharge end of the lehr with portions broken away to show internal construction; and Fig. 11 is a longitudinal central vertical section similar to Fig. 4 of an open-fired heating or firebox section which in interchangeable with the muffled firebox section shown in Figs. 1 and 3; and Fig. 12 is a cross-sectional view on line 12—12 of a portion only of the open-fired firebox section.

The principal components of lehrs embodying the present invention will be understood from the following general description made with reference to Figs. 1 and 2 of the drawings.

GENERAL DESCRIPTION

The lehr includes a firebox or heating section, generally designated 1, which forms the conditioning zone portion of a tunnel T that supplies all the heat required to effect annealing of ware passing through the lehr tunnel.

Rearward of the firebox 1 are two sections 2 and 3 which provide a slow cooling or annealing zone portion of the tunnel T. A recirculating fan 4 mounted on the top of the section 3 operates at constant speed to draw a preselected constant amount of air from the rear end of the annealing zone portion of the tunnel T and to force that air through ducts or flues 5 and 6 (Figs. 5 and 6) and downcomers 7 and 8 (Figs. 3 and 4) for reintroduction into the tunnel T at the front of the firebox section. The flues 5 and 6 are provided with dampers D for altering the rate at which air is discharged into the downcomers 7 and 8. The air from the downcomers 7 and 8 also may be directed in whole or in part into a belt warmer 9 at the bottom and front of the firebox section 1 to warm portion 10a of a continuous driven endless belt 10 on which ware is transported through the lehr.

Extending rearwardly from the annealing zone (sections 2 and 3) is a muffled cooling zone of the tunnel which is provided by lehr sections 11 and 12. This zone cools the ware at a somewhat faster rate than the annealing zone and prepares the ware so that it may enter, without breakage from heat shock, a forced cooling zone which is provided by lehr sections 13 and 14. Thus, the muffled cooling zone acts as a buffer between the slow cooling or annealing zone and the forced cooling zone where the ware is cooled to handling temperatures. Fans 15 (Figs. 9 and 10) in each of the sections 13 and 14 supply cooling air by means of which the necessary cooling is effected in the forced cooling zone, and, in addition, longitudinal air drift is established in the tunnel T to maintain desired temperature conditions throughout its length.

The several cooling zones of the lehr tunnel T are each formed by the individual sections 3 and 4, 11 and 12, and 13 and 14, respectively, rather than by single sections, in order that the length of the zones may be readily altered to satisfy the requirements of different ware types and weights. One or more sections may be inserted or removed from each of the zones thereby giving the lehr versatility. Alterations in zone lengths and the type of lehr fire (open, muffled or electric) is facilitated by mounting each of the lehr cooling sections and the firebox section on casters. Joints between adjacent lehr sections are designed for easy separation when cooling sections are to be added or removed and when the firebox is to be replaced.

*Firebox and conditioning zone*

Referring more particularly to Figs. 3 and 4, the firebox section 1 includes a suitable frame structure generally designated 16, which forms the front section of the tunnel T through which ware is transported by the endless belt conveyor 10. A fully muffled combustion chamber 17 which is located beneath the belt 10 contains a burner block 18 gaseous combustion products from which are directed through a horizontal baffled passage in the chamber 17 and out through ducts or stacks 19 and 20 which extend upwardly through the downcomers 7 and 8, respectively.

After fuel is ignited at the burner 18, its combustion is completed in the main chamber forward of the first baffle 17a which divides and directs the combustion gases through passageways which are at opposite sides of the lehr and which are baffled as at 17b so as to assure maximum heat extraction from the gases before they pass through the two up-take vents 19 and 20. Ejectors 19a and 20a at the top of the up-takes together with a blower B (Figs. 1 and 3) provide the necessary drafts for drawing the gases from the chamber 17 and as the ejectors are independently controlled, they provide means for regulating the portions of heat distributed to the opposite sides of the tunnel.

The top and bottom of the combustion chamber 17 is formed of highly heat-conductive tile 21 which provides for a maximum transfer of heat directly to the air in the tunnel T and to the air in a passageway 22 beneath the tiles 21 which receives heated air from the downcomers 7 and 8 and directs it upwardly through a vertical passageway 23 into the front end of the tunnel.

Located at the upper end of the passageway 23 which extends transversely across the tunnel is a splitter deflector 24 which may be manually adjusted, as by means of a handle 24a, so that all or part of the heated air from the passageway 23 is directed out of the tunnel to preheat the lehr belt 10. The amounts of air deflected from the passageway 23 into and out of the tunnel T may be varied from 0 to 100%, depending upon the setting of the splitter deflector 24. The deflector may also be skewed to counteract or compensate for cold ware or cold air entrance on one or the other side of the tunnel.

The belt warmer 9 beneath the firebox provides an enclosed passageway 26 through which the endless belt 10 returns to the front end of the lehr and into which air from the downcomers 7 and 8 is discharged in predetermined amounts regulated by a damper 27. The damper 27 is automatically preset by an air motor 29 through suitable linkage generally designated 28 and including components 28a–e (inclusive) responsively to changes in temperature of a thermostatic element 30 preferably located at the top and adjacent the front end of the tunnel T. An operative connection from the thermostat 30 to the motor 29 is shown diagrammatically by line 30a which connects and makes the motor 29 responsive to change in temperature of the thermostat 30. The location of the thermostat 30 while preferably as shown in Fig. 3 of course is not mandatory and may be elsewhere as operation and expediency suggest.

A door 31 is provided for opening and closing the tunnel entrance at the front end of the lehr.

The muffled type firebox 1 heretofore described with reference to Figs. 3 and 4 is generally the same as and is interchangeable with an open-fired heating section 1' shown in Figs. 11 and 12 but the internal structure of the two sections is somewhat different.

Referring more particularly to Figs. 11 and 12 which show the open-fired conditioning section 1', the downcomers 7' corresponding to the downcomers 7 and 8 of the firebox 1 (Fig. 3) discharge air directly into the open rear end of a combustion chamber 17' where the air mixes with the combustion products of a burner 18' which extends into the open end. The burner 18' is located at the rear end on the longitudinal center line of the combustion chamber 17' and the products of combustion pass from the front end of the chamber 17' into the lehr tunnel T through a vertical passage 23'. The splitter deflector 24, belt prewarmer 25 and damper 27 together with other elements of the open-fired section 1', are identical with corresponding like numbered elements of the muffled fired section heretofore described with reference to Figs. 3 and 4.

When it is desired to change from an open fired lehr to a fully muffled or vice versa, it is only necessary to change the firebox sections 1 and 1'. The exchange may be effected in a minimum of down time and without the necessity of altering other components of the lehr.

The fully muffle-fired section can be fired with oil, natural gas, propane or city gas. Conversion from gas to oil may be made by replacing the burner 18', or if a combination burner is used, a simple change-over in its valving is all that is required. The open-fired section can be fired with any clean, sulphur-free fuel, such as natural propane, or city gas if sulphur content is low enough.

The conditioning sections 1 and 1' are both fully insulated as at 25 so as to keep heat loss from the tunnel walls to the atmosphere at a minimum.

Slow cooling or annealing zone

Figure 5:
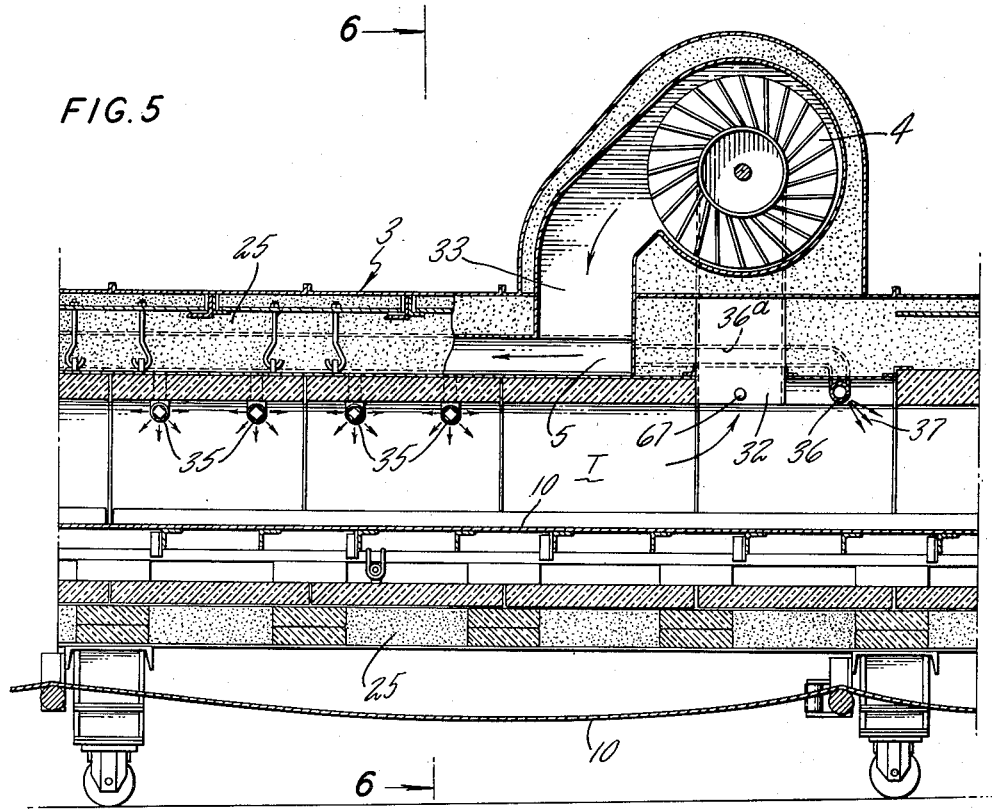
Fig. 5 is an enlarged longitudinal central vertical section of the rear section of the slow cooling or annealing zone of the lehr shown in Fig. 1.
Figure 6:
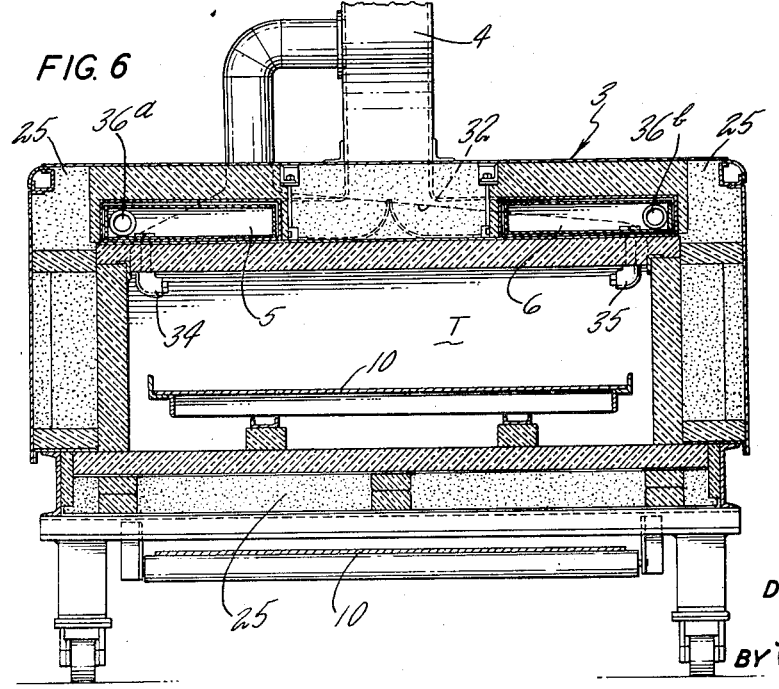
Fig. 6 is a cross-sectional view taken on line 6—6 of Fig. 5 showing a transverse section of the annealing zone.

The sections 2 and 3 which provide the slow cooling or annealing portion of the tunnel 9 also are fully insulated, as shown at 25 in Figs. 5 and 6. The recirculating fan 4 mounted on the top and at the rear of the rearmost annealing section 3 has an intake 32 which extends transversely of the tunnel its full width and an exhaust 33 which feeds to both of the ducts 5 and 6 which return heated air to the firebox section 1 and to the belt warmer 9.

At both sides of the tunnel T adjacent the top thereof, two series of nozzles 34 and 35 direct a small percentage of the air from the ducts 5 and 6, respectively, transversely of and toward the longitudinal center line of the tunnel to establish transverse circulation and assure temperature uniformity at every cross-section in the annealing zone of the tunnel.

Additional passageways 36a and 36b direct another small portion of air from the respective ducts 5 and 6 to both ends of a pipe 36 which extends transversely across the tunnel T rearwardly of the intake 32. The pipe 36 discharges the air through a suitable slot or series of holes as an air curtain 37 across the tunnel. It also is desirable for the pipe 36 to direct the air curtain 37 rearwardly as well as downwardly across a complete cross-section of the tunnel. It therefore is preferable that the pipe 36 be located in a recess at the top of the tunnel T.

Muffle or intermediate cooling zone

Figure 7:
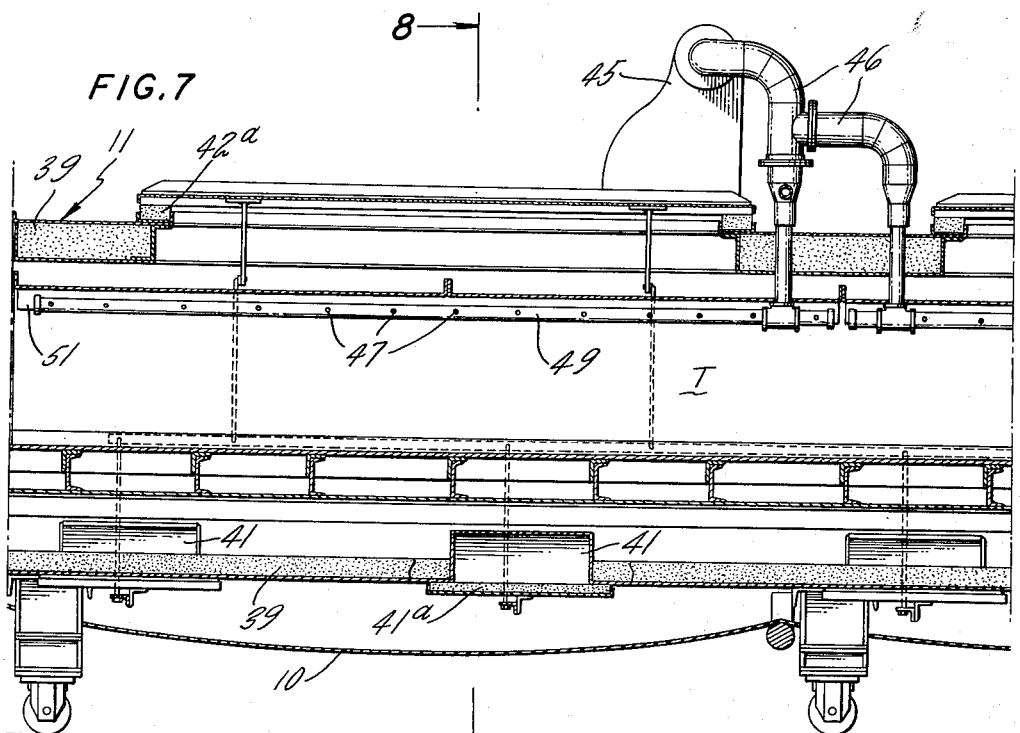
Fig. 7 is an enlarged longitudinal central vertical section of the fast cooling section of the lehr shown in Figs. 1 and 2.
Figure 8:
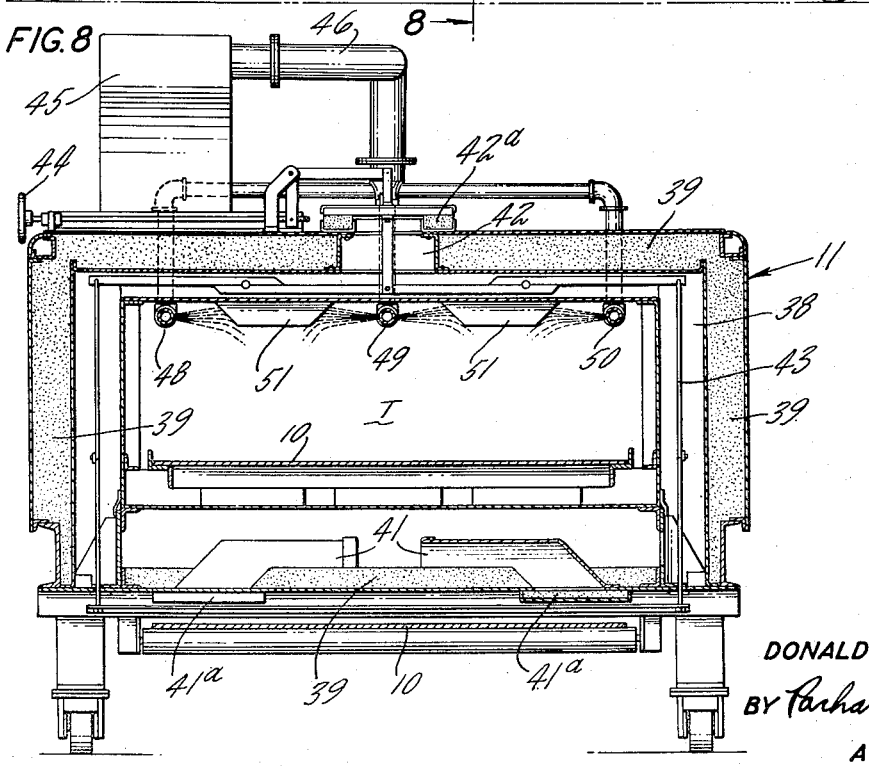
Fig. 8 is a sectional view taken on line 8—8 of Fig. 7.

As heretofore described, the muffle or intermediate cooling zone may comprise one or more sections 11, 12 (Figs. 1 and 2), the construction of which are substantially the same. The purpose of this zone is to condition the ware for delivery to the rapid cooling zone by cooling at a somewhat more rapid rate than in the slow cooling or annealing zone. The details of the muffle cooling sections do not constitute a part of the present invention. The section 11 shown in Figs. 7 and 8 is illustrative of a suitable section for this zone. The portion of the tunnel T in the sections 11 and 12 has hollow walls or flues 38 enclosed by a well insulated casing 39. Cold air enters the hollow walls 38 through bottom intake ports 41 and moves across the bottom and up the sides of the section to escape through top ports 42 after extracting heat from the tunnel wall. Suitable dampers 41a and 42a control their respective intake and exhaust ports 41 and 42. The several dampers 41a and 42a are interconnected by suitable linkage 43 by means of which the adjustment of the dampers may be effected simultaneously.

The adjustment is effected manually in the illustrated embodiment of the invention by means of hand wheel 44. However, it will be apparent that adjustment may be effected automatically by operatively connecting the dampers to a temperature sensitive element in the tunnel.

Although generally unnecessary, extreme requirements of the lehr may make it desirable to supplement the muffle-cooling in sections 11 and 12 by introducing some cooling air directly into the interior of the sections. This may be effected by means of a blower 45 which may be operated to force cooling air through pipes 46 and out of spaced orifices 47 in pipes 48, 49 and 50 which extend longitudinally in the tunnel T adjacent the top thereof.

As shown in Fig. 8, the cooling air is directed toward the center and along the top of the tunnel from the pipes 48 and 50 and outwardly from the pipe 49 so that the jets oppose one another. Vanes 51 extend transversely of the tunnel intermediate and in the path of opposing jets to minimize the effect of the jets on longitudinal drift in the tunnel.

The forced cooling zone

The rapid or forced cooling zone of the lehr comprises the sections 13 and 14 in which ware is rapidly cooled to handling temperatures. The tunnel walls in this zone are substantially uninsulated. Means are provided in each of the sections 13 and 14 for blowing and circulating cool air into and out of the tunnel.

More particularly, each section 13 and 14 includes two propeller units 52 which introduce the cooling air into the tunnel. Each unit 52 includes a housing 53 which is mounted on the top of the tunnel and contains one of the fans or propellers 15 each of which is rotated in a horizontal plane by its own motor 55 and belt drive 56.

The fan enclosures or housing 53 are each provided on both sides with dampers 57 each having a portion 57a for controlling the entrance of cold air into the housing and a portion 57b for controlling the exhaust of warm air therefrom. Depending upon the size of the air intake openings established by the setting of the dampers 57, a greater or lesser amount of outside cooling air may be discharged against the ware. The cooling air may thereafter escape upward and outward of the section or be drawn back to the fan 15 where it mixes with new intake air and is recirculated. Using completely fresh cooling air maximum cooling is effected, while by using completely recirculated air minimum cooling is obtained. Partitions 58 preferably are provided in the cooling section which separate the air directed downwardly on the ware from that drawn upwardly and recirculated by the fan or exhausted from the section. As shown in dotted line in Fig. 10, the damper blade 57b cooperates in its fully open position with the partition 58 to prevent recirculation of cooling air to the fan. The dampers 57 when fully closed provide for recirculation of heated air without the addition of fresh cool air.

The two dampers 57 of each section may be, and preferably are, connected by linkage 59 so that they may be adjusted in unison and tunnel pressure changes minimized when the damper setting is altered by manual adjustment of handle 59a which is provided for that purpose.

Preferably, right and left hand fans 15 are used alternately to balance out propeller effects and, as shown in Figs. 9 and 10, a counterbalanced door 62 is provided at the rear of discharge end of the tunnel T in the lehr section 14.

Located beneath each housing 53 is a series of three spaced arcuate vanes or deflectors 60 each of which is mounted for pivotal movement between a forward drift inducing position shown in solid line in Fig. 9 and reversed or backward drift inducing position shown by dotted lines. The vanes 60 extend transversely of the tunnel and are interconnected with each other. All of the vanes 60 within both sections 13 and 14 of the forced cooling section are interconnected by suitable linkage, generally designated 61, with which simultaneous adjustment of their settings may be effected. The linkage 61 is automatically operable responsively to drift control mechanism hereinafter to be described. Arcuate scoops 63, which are located rearwardly of each set of three vanes 60, direct cooling air out from the tunnel through outlets 63a particularly when the vanes 60 are set in their most counterclockwise position for maximum reverse or backward drift. The escape of cooling air through the openings 63a lessens build up of back pressure in the tunnel and maximum backward drift can be established so as to rapidly heat the back end of the annealing zone when the thermostat 67 is below its desired temperature.

*Automatic controls*

The temperature in the tunnel above the firebox is controlled by thermostat 65 which regulates the burner 18. In addition, the thermostat 65 is connected with and secondarily modifies the action of a controller, generally designated 66, the details of which may vary and, as they are not a part of this invention, are not illustrated in the drawing. A preferred example of suitable controls is illustrated and described in my U. S. patent application, Serial No. 197,255, filed November 24, 1950.

The controller 66 also is connected with and is primarily actuated by a thermostatic element 67 located in the recirculating fan intake 32 (Fig. 5).

When the temperature at 67 is low, the controller 66 acts to move the vanes 60 in the forced cooling zone in a counterclockwise direction so as to increase the backward drift whereby more hot air is drawn back from the firebox. Conversely, when the temperature is high at 67, the controller 66 moves the vanes 60 clockwise whereby forward drift is increased to bring the temperature down again by means of cold air from the forced cooling zone. The exhaust passage 63a is closed by the nearest vanes 60 in their maximum forward drift positions and exhausts maximum air when the vanes 60 are at backward drift settings in which they direct air into the scoops 63.

The mean tunnel pressure in the vicinity of the cooling units 52 increases as the cooling dampers 57 are opened. In the forward drift positions of the vanes 60, the pressure is always positive, the units 52 adding air to the tunnel because of leakage even when the dampers 57 are closed. However, air is exhausted through outlets 63a with backward drift settings for the vanes 60 and pressures are lowered becoming negative if the cooling dampers 57 are closed.

It is necessary to modify the drift under some conditions, such as, for example, during heating up or during front end chilling. If the front end only is cold, control is transferred to the firebox thermostat 65 which causes the controller 66 to operate so that a forward drift is created and maintained until the front end recovers and returns to normal. If both temperature control points 65 and 67 are cold, drift control is suspended and the controller 66 causes the control vanes 60 to assume a preselected fixed position which establishes neutral drift. This action facilitates recovery of lehr temperatures. It also permits heating up of the lehr without attention because normal action of control is resumed as soon as points 65 and 67 of the lehr reach their selected temperatures.

The two thermostats 65 and 67 are all that are needed to maintain proper temperatures throughout the annealing zone. Because of the principle of operation, the time-temperature curve throughout the zone is practically a straight line.

By fixing the end temperatures, complete control is obtained in any selected range.

The thermostat 30 which is located just inside the front entrance of the tunnel, controls the recirculation of air in accordance with indraft or outdraft at the entrance. The function of the thermostat 30 and its motor 29 is the adjustment of the damper 27 to divide the returned air between the reheater space 22 and the belt preheater 9. Since the tendency for outdraft at the front entrance is caused by increased forward drift, and since the drift controller 66 increases forward drift with increasing load, the front entrance control responds indirectly to load changes. These responses are as follows: with light load or an empty lehr, the damper 27 is automatically adjusted to direct substantially all of the return air in the downcomers 7 and 8 into the reheating chamber 22 and back into the tunnel T for recirculation. With light to moderate loads, the damper 27 is automatically adjusted so that only a portion of the return air is reheated in the space 22, the balance going to the belt heater 9. With moderate to heavy loads (above 350 oz. per minute in a 64 ft. lehr), return air volume is substantially entirely diverted into the belt heater 9. Thermostat 30 thus maintains a neutral drift at the front door 31 and prevents an over-supply of hot air with waste of heat.

These provisions assure adequate heat for the annealing zone, minimum loss through heating of excess air, maximum cooling capacity, and maximum heat recovery through belt preheating.

The maximum backward drift occurs in the tunnel T when the lehr is empty. This drift is a flow of air in definite amount which in cooling from 65 to 67 will give up the amount of heat needed to balance wall losses. The blower 4 handles a virtually constant amount of air at all times and this amount after deducting the relatively small amount discharged by the nozzles 34 and 35, just equals the maximum drift. To maintain a neutral flow at the front door with an empty lehr, all the heated air returns to 67 for recirculating and there is a neutral flow back of 67 which the air curtain 36a helps to maintain.

With a load of glass, the required backward drift diminishes, but the blower 4 continues to pass the same volume. The thermostat 30 operates to divert some of the air to the belt preheater 9 so that the air heated in the passage 22 under the firebox 1 is only that necessary to supply the diminished tunnel drift and keep a neutral drift at the front door. The air used for belt heating is made up by forward drift from beyond 67 and in effect heat in the belt preheater includes heat recovered from the ware cooling beyond 67.

With a fairly heavy load, the tunnel drift becomes all forward and none of the air from the blower 4 is heated in the chamber 22 but all is used for belt preheating.

In the open fired lehr 1', the recirculated blower air mixes directly with products of combustion. The operation is in other respects quite similar.

Having thus described my invention, I claim:
1. In a glassware annealing tunnel lehr having a conditioning section, a slow cooling section and a forced cooling section which provide zones of the tunnel through which ware is transported on an endless belt conveyor, a source of heat in said conditioning section, means for withdrawing atmosphere from the rear end of the slow cooling zone of said tunnel and directing the withdrawn atmosphere to the conditioning section of the lehr, means for dividing said withdrawn atmosphere and discharging a portion of the withdrawn atmosphere into the conditioning zone of the tunnel and another portion out of the lehr, means for regulating the portion of withdrawn atmosphere discharged into the conditioning zone of the tunnel relative to the portion discharged from the lehr, and thermostatic means responsive to lehr temperature for automatically adjusting said regulating means.

2. In a glassware annealing tunnel lehr having a conditioning section, a slow cooling section and a forced cooling section which provide zones of the tunnel through which ware is transported on an endless belt conveyor, a source of heat in said conditioning section, means for withdrawing atmosphere at a constant rate from the rear end of the slow cooling zone of said tunnel and directing the withdrawn atmosphere to the conditioning section of the lehr, means for dividing and discharging a portion of the withdrawn atmosphere into the conditioning zone of the tunnel, and another portion out of the lehr, adjustable damper means for controlling the volume of atmosphere which is withdrawn from the rear end of the slow cooling zone and returned to the conditioning section, means for regulating the portion of withdrawn atmosphere discharged into the conditioning zone of the tunnel relative to the portion discharged from the lehr, and thermostatic means responsive to lehr temperature for automatically adjusting said regulating means.

3. In a glassware annealing tunnel lehr having a conditioning section, a slow cooling section and a forced cooling section which provide conditioning, slow cooling and forced cooling zones of the tunnel through which ware is transported on an endless belt conveyor, a preheater in the conditioning section for heating the belt outside of the tunnel, a single source of heat in said lehr located in the conditioning section, means for withdrawing atmosphere from the rear end of the slow cooling zone of said tunnel and directing it into the belt preheater outside the tunnel and into the conditioning zone within the tunnel, damper means for regulating the proportion of returned atmosphere discharged into the conditioning zone of the tunnel and into the belt preheater, thermostatic means responsive to the temperature of the atmosphere in the front of the conditioning zone for automatically adjusting said regulating damper means, means for introducing cooling air into the forced cooling zone, deflector means for regulating the direction of flow of said cooling air into said tunnel and the longitudinal drift of air in the tunnel, and means for adjusting said deflector means to forward and reverse drift-inducing positions.

4. In a glassware annealing tunnel lehr having a conditioning section, a slow cooling section and a forced cooling section which provide conditioning, slow cooling and forced cooling zones of the tunnel through which ware is transported on an endless belt conveyor, a belt preheater in the conditioning section through which the belt is returned to a loading station, a source of heat in said conditioning section, said source being located between the belt preheater and the conditioning zone of the tunnel and being the only source within the lehr, means for withdrawing atmosphere at a constant rate from the slow cooling zone of said tunnel and returning it to the conditioning section for discharge into the belt preheater and into the conditioning zone of the tunnel, damper means for predetermining the constant volume of atmosphere that is withdrawn from the rear end of the slow cooling zone and returned to the conditioning section, damper means for regulating the proportion of returned atmosphere discharged into the conditioning zone of the tunnel and into the belt preheater, thermostatic means responsive to the temperature of the atmosphere in the front of the conditioning zone for automatically adjusting said regulating damper means, means for directing increments of the atmosphere withdrawn from the tunnel back into the slow cooling zone of the tunnel at spaced intervals to effect transverse circulation in said zone, means for directing a curtain of said withdrawn atmosphere transversely of said tunnel intermediate said slow and forced cooling zones, means for introducing cooling air into the forced cooling zone, deflectors for directing the flow of said cooling air into said tunnel and the longitudinal drift of air in the tunnel, means for adjusting said deflectors to forward and reverse drift-inducing positions, and a discharge passageway for venting atmosphere from the forced cooling zone, said discharge passageway being closed by a deflector in its extreme forward drift-inducing position, said passageway including a scoop for receiving and directing most of the cooling air from the deflectors in their reverse drift-inducing positions out through said passageway.

5. In a glassware annealing tunnel lehr having a forced cooling tunnel section, a blower for introducing cooling air into said section, a deflector for directing the flow of cooling air into the tunnel, means for adjusting said deflector to induce forward and reverse longitudinal drift of atmosphere in said tunnel, a discharge passageway for venting atmosphere from the cooling section, said discharge passageway being closed by said deflector in its extreme forward drift-inducing position, and said discharge passageway including a scoop for receiving and directing cooling air from the deflector in its extreme reverse drift-inducing position out through said discharge passageway.

6. In a glassware annealing tunnel lehr having a forced cooling tunnel section, a series of spaced blowers for introducing air transversely into said section, a plurality of deflectors for directing the flow of cooling air from said blowers into the tunnel, means for simultaneously adjusting said deflectors to selectively induce forward and reverse longitudinal drift of atmosphere in said tunnel, means having a discharge orifice adjacent each blower for venting atmosphere from the cooling section, each of said orifices having a scoop constructed and arranged to receive cooling air from the deflectors in their reverse drift-inducing positions and discharging the air out through said orifices, and wherein the deflectors in their extreme forward drift positions cooperate with the scoops to reduce passage of air through said orifices.

DONALD G. MERRILL.

References Cited in the file of this patent

UNITED STATES PATENTS

| Number | Name | Date |
|---|---|---|
| 1,670,769 | Hiller | May 22, 1928 |
| 1,783,208 | Williams | Dec. 2, 1930 |
| 2,275,263 | Merrill | Mar. 3, 1942 |
| 2,507,673 | Merrill | May 16, 1950 |